US00RE42077E

(19) United States
(12) Reissued Patent
Savage

(10) Patent Number: US RE42,077 E
(45) Date of Reissued Patent: Jan. 25, 2011

(54) COMPUTER SYSTEM FOR MAINTAINING CURRENT AND PREDICTING FUTURE FOOD NEEDS

(76) Inventor: John K. Savage, 5 Greenwood Extension, Raymond, NH (US) 03077

(21) Appl. No.: 10/077,364

(22) Filed: Feb. 15, 2002

Related U.S. Patent Documents

Reissue of:
(64) Patent No.: 6,026,372
Issued: Feb. 15, 2000
Appl. No.: 08/863,000
Filed: May 27, 1997

(51) Int. Cl.
*Q06Q 20/00* (2006.01)

(52) U.S. Cl. ..... 705/22; 705/28; 705/29; 705/15; 700/111; 186/38; 235/385

(58) Field of Classification Search ..... 705/8, 705/15, 22, 28–29, 7, 10, 16; 186/38; 235/385; 700/247, 207, 245; 99/235, 407; *G06F 17/60, G06F 1/14*
See application file for complete search history.

(56) References Cited

U.S. PATENT DOCUMENTS

| | | | | | |
|---|---|---|---|---|---|
| 2,887,382 | A | * | 5/1959 | Rivoche | 426/574 |
| 2,975,055 | A | * | 3/1961 | Brown et al. | 99/352 |
| 3,690,247 | A | * | 9/1972 | Van Cleven et al. | 99/355 |
| 3,759,388 | A | * | 9/1973 | Thomason | 210/167 |
| 4,388,689 | A | | 6/1983 | Hayman et al. | |
| 4,505,194 | A | * | 3/1985 | Bishop et al. | 99/336 |
| 4,530,067 | A | | 7/1985 | Dorr | |
| 4,547,851 | A | * | 10/1985 | Kurland | 705/15 |
| 4,553,222 | A | * | 11/1985 | Kurland et al. | 705/15 |
| 4,569,421 | A | | 2/1986 | Sandstedt | 186/39 |
| 4,646,238 | A | * | 2/1987 | Carlson et al. | 700/95 |
| 4,922,435 | A | | 5/1990 | Cahlander et al. | |
| 5,003,472 | A | * | 3/1991 | Perrill et al. | 705/15 |
| 5,053,970 | A | * | 10/1991 | Kurihara et al. | 700/104 |
| 5,093,556 | A | | 3/1992 | Oelfke | 219/386 |
| 5,128,862 | A | | 7/1992 | Mueller | |
| 5,132,914 | A | * | 7/1992 | Cahlander et al. | 700/211 |

(Continued)

FOREIGN PATENT DOCUMENTS

| | | | | |
|---|---|---|---|---|
| GB | 2203320 | A | * | 10/1988 |
| GB | 2206222 | A | * | 12/1988 |
| JP | 58108337 | A | * | 6/1983 |
| JP | 02056889 | A | * | 2/1990 |
| JP | 06259662 | A | * | 9/1994 |
| JP | 07296071 | A | * | 11/1995 |
| JP | 8000414 | | | 1/1996 |
| JP | 2006134004 | A | * | 5/2006 |
| WO | WO 2007038255 | A2 | * | 4/2007 |

OTHER PUBLICATIONS

Pervasive computing puts food on the table; Stanford, V.; Pervasive Computing, IEEE; vol. 2, Issue 1, Jan.–Mar. 2003 pp. 9–14; Digital Object Identifier 10.1109/MPRV.2003.1186719.*

(Continued)

*Primary Examiner*—Cuong H Nguyen
(74) *Attorney, Agent, or Firm*—Marshall, Gerstein & Borun LLP

(57) ABSTRACT

A computer system (10) is provided which includes an electronic cash registers (11) electronically coupled to a cooking station monitor (12) and input (13), and a manager's station monitor (15), input (16), and printer (17). The system instructs the cook to initiate a cooking process in response to the number of items on hand and items currently being cooked in view of the number of items typically desired to have on hand at a particular time of the day.

22 Claims, 4 Drawing Sheets

| ITEM | DESIRED QTY AT SPECIFIC TIME | | SPECIAL ADD-ON QUANTITY | TOTAL QUANTITY | TIME TO PREPARE | # COOKED AT A TIME |
|---|---|---|---|---|---|---|
| BURGER | 11:00 A.M. | 3 | 2 | 5 | 10 MIN. | 3 |
| | 11:15 A.M. | 5 | 2 | 7 | | 3 |
| | 11:30 A.M. | 5 | 3 | 8 | | 4 |
| | 11:45 A.M. | 7 | 3 | 10 | | 5 |
| ROLLS | 11:00 A.M. | 12 | 4 | 16 | 20 MIN. | 12 |
| | 11:30 A.M. | 18 | 4 | 22 | | 18 |
| | • • • • | | | | | |

U.S. PATENT DOCUMENTS

| | | | | | |
|---|---|---|---|---|---|
| 5,172,313 | A | * | 12/1992 | Schumacher | 705/7 |
| 5,172,328 | A | | 12/1992 | Cahlander et al. | |
| 5,188,020 | A | | 2/1993 | Buchnag | 99/468 |
| 5,218,527 | A | * | 6/1993 | Ishikawa et al. | 705/15 |
| 5,253,564 | A | | 10/1993 | Rosenbrock et al. | 99/328 |
| 5,357,426 | A | | 10/1994 | Morita et al. | |
| 5,504,589 | A | | 4/1996 | Montague et al. | 358/403 |
| 5,510,979 | A | | 4/1996 | Moderi et al. | |
| 5,539,671 | A | | 7/1996 | Albrecht et al. | |
| 5,553,312 | A | | 9/1996 | Gattey et al. | 455/11.1 |
| 5,579,952 | A | | 12/1996 | Fiedler et al. | 221/150 |
| 5,590,586 | A | | 1/1997 | Ulfig et al. | 99/339 |
| 5,602,730 | A | * | 2/1997 | Coleman et al. | 705/15 |
| 5,616,269 | A | | 4/1997 | Fowler et al. | 219/720 |
| 5,630,070 | A | * | 5/1997 | Dietrich et al. | 705/8 |
| 5,653,906 | A | | 8/1997 | Fowler et al. | 219/716 |
| 5,712,958 | A | * | 1/1998 | Landolt | 706/3 |
| 5,724,886 | A | | 3/1998 | Ewald et al. | 99/374 |
| 5,772,072 | A | | 6/1998 | Prescott et al. | 221/121 |
| 5,812,393 | A | | 9/1998 | Drucker | |
| 5,832,446 | A | * | 11/1998 | Neuhaus | 705/1 |
| 5,839,115 | A | * | 11/1998 | Coleman | 705/15 |
| 5,845,263 | A | * | 12/1998 | Camaisa et al. | 705/27 |
| 5,947,012 | A | | 9/1999 | Ewald et al. | 99/374 |
| 6,011,243 | A | | 1/2000 | Arnold et al. | 219/506 |
| 6,026,372 | A | * | 2/2000 | Savage | 705/15 |
| 6,052,667 | A | * | 4/2000 | Walker et al. | 705/15 |
| 6,088,681 | A | | 7/2000 | Coleman et al. | 705/15 |
| 6,119,587 | A | | 9/2000 | Ewald et al. | 99/374 |
| 6,141,647 | A | * | 10/2000 | Meijer et al. | 705/1 |
| 6,168,051 | B1 | * | 1/2001 | Poppell | 222/209 |
| 6,209,447 | B1 | | 4/2001 | Ewald et al. | 99/483 |
| 6,298,331 | B1 | * | 10/2001 | Walker et al. | 705/15 |
| 6,345,259 | B1 | * | 2/2002 | Sandoval | 705/7 |
| 6,826,538 | B1 | * | 11/2004 | Kalyan et al. | 705/7 |
| 7,184,990 | B2 | * | 2/2007 | Walker et al. | 705/400 |
| 2001/0056376 | A1 | * | 12/2001 | Walker et al. | 705/15 |
| 2004/0260513 | A1 | * | 12/2004 | Fitzpatrick et al. | 702/182 |
| 2006/0015289 | A1 | * | 1/2006 | Shakman et al. | 702/173 |
| 2006/0218057 | A1 | * | 9/2006 | Fitzpatrick et al. | 705/28 |
| 2007/0150378 | A1 | * | 6/2007 | Walker et al. | 705/27 |
| 2007/0283905 | A1 | * | 12/2007 | Reinhardt | 122/348 |

OTHER PUBLICATIONS

Aligning strategic planning with agile development: extending agile thinking to business improvement; Rand, C.; Eckfeldt, B.; Agile Development Conference, 2004; Jun. 22–26, 2004 pp. 78–82; Digital Object Identifier 10.1109/ADEVC.2004.5.*

Measuring input productivity gains from information technology: a case study of Positran at Hardee's Inc;Banker, R.D.; Kauffman, R.J.; Morey, R.C.; System Sciences, 1990., Proceedings of the Twenty–Third Annual Hawaii International Conference on; vol. iv, Jan. 2–5, 1990 pp. 120–126 vol. 4; Digital Object Identifier 10.1109/HICSS.1990.205247.*

The microwave technology; Bih, J.Z.; Microwave and Telecommunication Technology, 2003. CriMiCo 2003. 13th International Crimean Conference; Sep. 8–12, 2003 pp. 15–21; Digital Object Identifier 10.1109/CRMICO.2003.1256324.*

Gauging the quality of managerial decisions regarding information technology deployment; Banker, R.D.; Kauffman, R.J.; Lally, L.; System Sciences, 1991. Proceedings of the Twenty–Fourth Annual Hawaii International Conference on; vol. iv, Jan. 8–11, 1991 pp. 276–286 vol. 4; Digital Object Identifier 10.1109/HICSS.1991.184070.*

A Research on Related Questions of Chinese Food Cold Chain Development; Wang, Lan; Zhang, Zheng Ya; Management of e–Commerce and e–Government, 2008. ICMECG '08. International Conference on, Oct. 17–19, 2008 pp. 18–21; Digital Object Identifier 10.1109/ICMECG.2008.76.*

Design and Analysis of Food–Chain Algorithm; Hai–fei Yu; Ding–wei Wang; Computational Intelligence and Security, 2006 International Conference on; vol. 1, Nov. 2006 pp. 453–456; Digital Object Identifier 10.1109/ICCIAS.2006.294175.*

Zuber, Tapping a human resource: Restaurants fight labor crunch with training programs, Nation's Restaurant News, v 30, n 26, p. 33–34, 36 (from Dialog(R) File 13, acc. No. 00524927).*

Beesley, Collecting and Composting Food Waste, BioCycle v33n10 pp. 56–59, Oct. 1992 (from Dialog(R) File 15 acc. No. 00645476).*

Derwent–ACC–No. 1989–001797.*

Derwent–ACC–No. 1988–288058.*

Derwent–ACC–No. 1986–022677.*

Derwent–ACC–No. 1976–A8720X.*

Miyake, K., Derwent–ACC–No. 1987–336951, Controlling operation of cooiking appts . . . , Dec. 2, 1987.*

Taco Bell Steam Table Timer operator's Manual, Aug. 19, 1994.

Merlin II Timers product brochure, 1998.

* cited by examiner

| ITEM | DESIRED QTY AT SPECIFIC TIME | | SPECIAL ADD-ON QUANTITY | TOTAL QUANTITY | TIME TO PREPARE | # COOKED AT A TIME |
|---|---|---|---|---|---|---|
| BURGER | 11:00 A.M. | 3 | 2 | 5 | 10 MIN. | 3 |
| | 11:15 A.M. | 5 | 2 | 7 | | 3 |
| | 11:30 A.M. | 5 | 3 | 8 | | 4 |
| | 11:45 A.M. | 7 | 3 | 10 | | 5 |
| ROLLS | 11:00 A.M. | 12 | 4 | 16 | 20 MIN. | 12 |
| | 11:30 A.M. | 18 | 4 | 22 | | 18 |
| | • • • • | | | | | |

FIG 4

COMPUTER SYSTEM FOR MAINTAINING CURRENT AND PREDICTING FUTURE FOOD NEEDS

Matter enclosed in heavy brackets [ ] appears in the original patent but forms no part of this reissue specification; matter printed in italics indicates the additions made by reissue.

TECHNICAL FIELD

This invention relates to computer systems, and specifically to computer systems which maintain a current inventory of prepared foods and predicts future needs of the prepared foods.

BACKGROUND OF THE INVENTION

In today's restaurant industry an inventory of prepared food items is maintained in order to insure a desired quantity is readily available for immediate sale. It is typically the restaurant manager's responsibility to monitor the current inventory of prepared food items and instruct the cook to prepare additional food items to meet future needs. The quantity of food items maintained in inventory and the estimation of the quantity of food items to prepare in advance of the need is accomplished through the manager's knowledge of past sales, waste and outside influences, such as weather conditions. Thus, should the restaurant manager be poor at calculating future needs or become unavailable or otherwise occupied this disruption may cause too much food to be prepared and therefore wasted, or too little food to be prepared and therefore become unavailable to future customers.

Systems have been designed, such as that shown in U.S. Pat. No. 5,218,527, which instruct the cook when to commence the items of a selected order so that all the items are completed at approximately the same time. This system however does not maintain a current inventory but is responsive to a select order of a customer. Hence, this system merely times when each item of a group of items should be commenced.

Therefore, a need still remains for a system which can maintain a current inventory of food items without instruction from a manager. Accordingly, it is to the provision of such that the present invention is primarily directed.

SUMMARY OF THE INVENTION

In a preferred form of the invention, a computer system is provided for determining and transmitting cooking commencement instruction for selected food items at time intervals to supply future needs of the selected food items. The computer system comprises a programmable memory, a cooking station monitor, a table of selected food items stored on the programmable memory, and a table of desired quantities of the selected food items at desired time intervals relating to the table of selected food items. The table of desired quantities at desired time intervals being stored on the programmable memory. The computer system also includes a table of cooking time to prepare intervals relating to the table of selected food items which is stored on the programmable memory, a variable quantity of processed selected food items stored on the programmable memory, clock means for establishing a current time, and control means for initiating a cooking instruction to the cooking station monitor in response to a selected relation between the current time and the table of desired quantities of the selected food items at desired time intervals and the table of cooking time to prepare intervals, and a selected relation between the variable quantity of selected food items and the table of desired quantities of selected food items at desired time intervals.

BRIEF DESCRIPTION OF THE DRAWINGS

FIG. 4 is a sample of data entries for the computer portions shown in FIG. 2.

DETAILED DESCRIPTION

Figure 1:
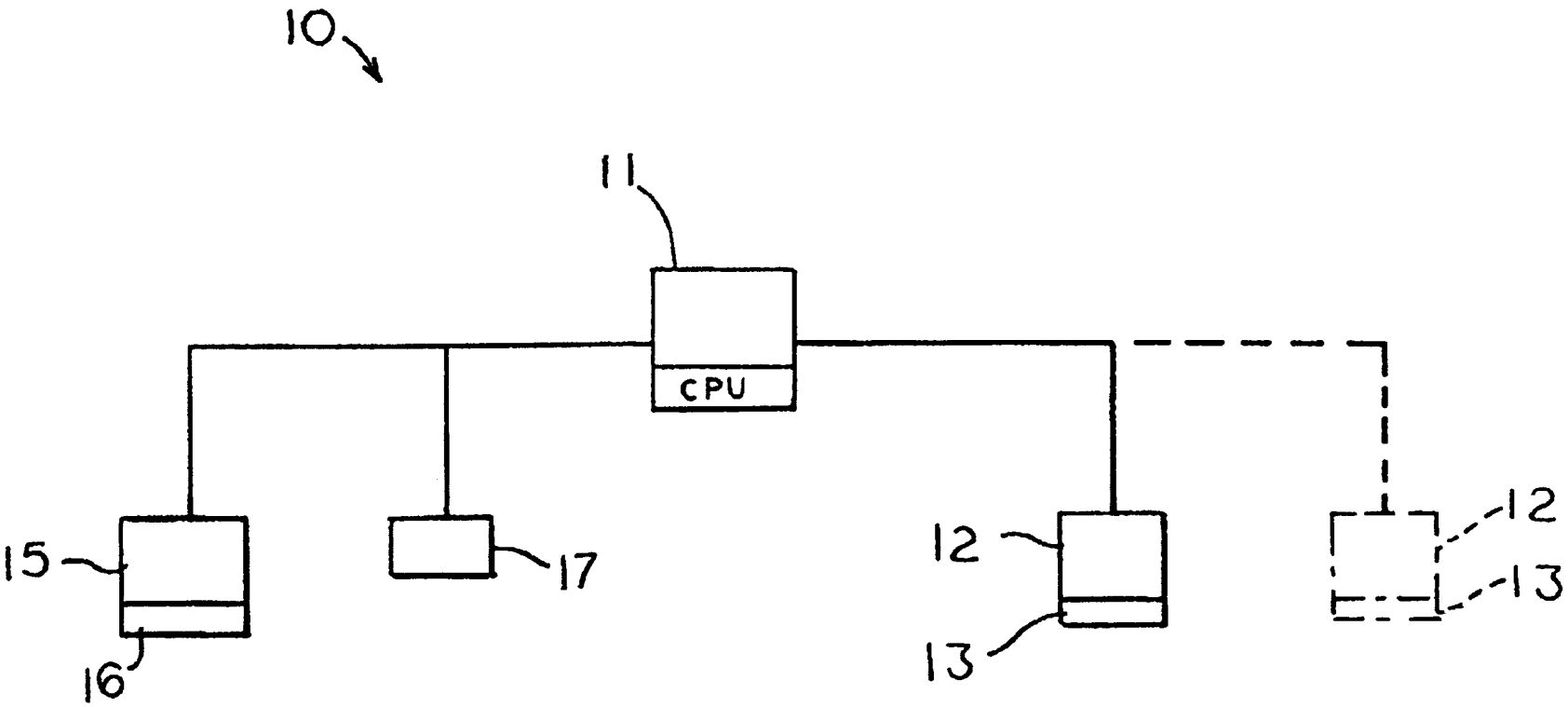
FIG. 1 is a schematic view of the computer system in a preferred embodiment.

Referring next to the drawings, there is schematically shown a computer system 10 for maintaining an inventory of food items through the prediction of future needs. The computer system 10 includes an electronic cash register 11, referred to as ECR hereinafter, which is electronically coupled to a cooking station monitor 12 and input 13, and a manager's station monitor 15, input 16, and printer 17. The computerized cash register 11 may be a Panasonic 7700 QUICK SERVICE SYSTEMS, made by Panasonic Information & Communications Company of Elgin, Ill., which includes a touchscreen workstation with a LCD touch panel and a programmable memory. Inputs 13 and 16 may be keyboards or touchscreen incorporated within the respective monitors.

Figure 2:
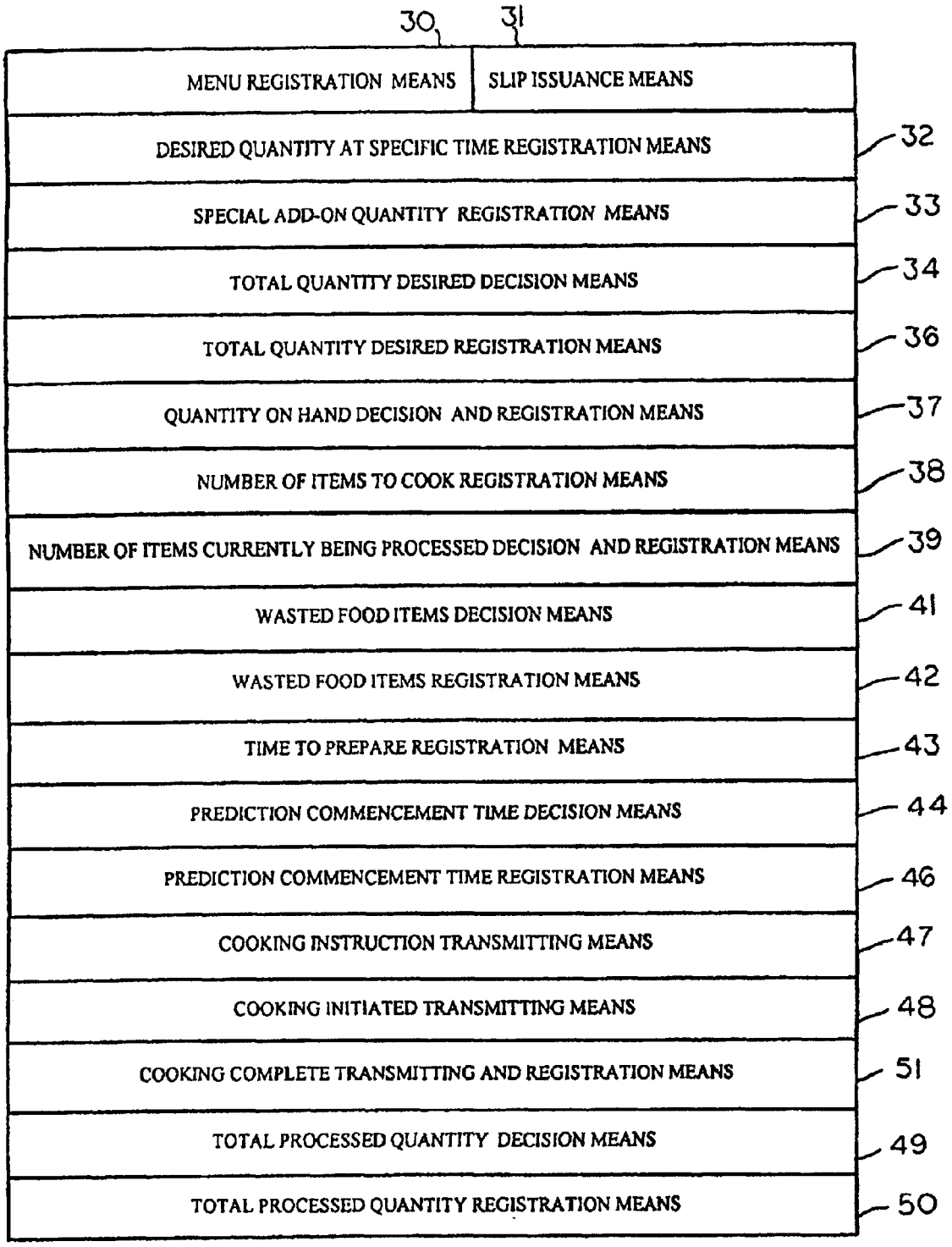
FIG. 2 is a block diagram showing the arrangement of a major portion of the computerized cash register shown in the computer system of FIG. 1.

FIG. 2 is a block diagram showing the arrangement of a major portion of the ECR 10. This includes a menu registration means 30 for registering therein the selected food items of a menu, slip issuance means 31 for issuing an order slip to a customer, a desired quantity at specific time registration means 32 for registering therein the desired quantity of a selected food item for a desired time period during the day, a special add-on quantity registration means 33 for registering therein a value for special food item quantity circumstances, total quantity desired decision means 34 for computing the desired quantity under special circumstances, total quantity desired registration means 36 for registering therein the total desired value therein, quantity on hand decision and registration means 37 for computing and registering therein the quantity of each food item on-hand, i.e. the quantity presently completely cooked, number of items to cook registration means 38 for registering therein the number of each food item to be cooked with each cooking instruction, number of items currently being processed decision and registration means 39 for registering therein the number of food items being processed, i.e. the quantity presently being cooked, wasted food items decision means 41 for computing the number of food items to be counted as waste, wasted food items registration means 42 for registering the value of wasted items from the wasted food items decision means 41, time to prepare registration means 43 for registering therein the time it takes to prepare each food item, i.e. the cooking time, prediction commencement time decision means 44 for computing the proper time to transmit a cooking instruction for each food item by subtracting the corresponding value of the time to prepare registration means 43 from the time value of the desired quantity at specific time registration means, prediction commencement time registration means 46 for registering therein the value of the prediction time commencement decision means 44, cooking instruction transmission means 47 for transmitting a cooking instruction to a cook station monitor 12, cooking initiated transmission means 48 for transmitting input of a commencement command from the cooking station input 16, total processed quantity decision means 49 for computing the total quantity of food items on-hand and presently cooking, total processed quantity registration means 50 for registering therein the value of the total processed quantity value decision means 49, and cooking complete transmitting and registration means 51 for transmitting the completion signal from the cooking station input 13 and registering the complete cooking of a food items. FIG. 4 shows an example of table entries entered into the just described registration means. It should be understood that the term "table" may also include a single entry value and that the term "value" is not restricted to a single entry but may include a table of values.

The information saved within the menu registration means 30, desired quantity at specific time registration means 32, number of items to cook registration means 38, and the time to prepare registration means 43 is entered into the memory upon the initial operation of the system. However, these values may be updated should it be determined that these values are not accurate portrays of daily activities. The information saved within the special add-on registration means 33 should be updated daily in order to reflect daily variances, such as weather conditions and daily specials on selected food items or special orders.

When menu food item, contained within the menu registration means 30, is requested by the customer the sales clerk enters the selected food item upon the ECR entry panel 21. The entry of the food items causes the quantity on hand decision and registration means 37 to subtract the number of ordered food items from the present value of the quantity on hand decision and registration means. This also causes the total processed quantity decision means 49 to subtract the ordered amount from the present value within the total processed quantity registration means 50, i.e. subtract ordered quantity from the aggregate of the quantity on hand and the quantity being processed. Upon the completion of the entire customer's order the ECR will generate a receipt through the slip issuance means 31.

Figure 3:
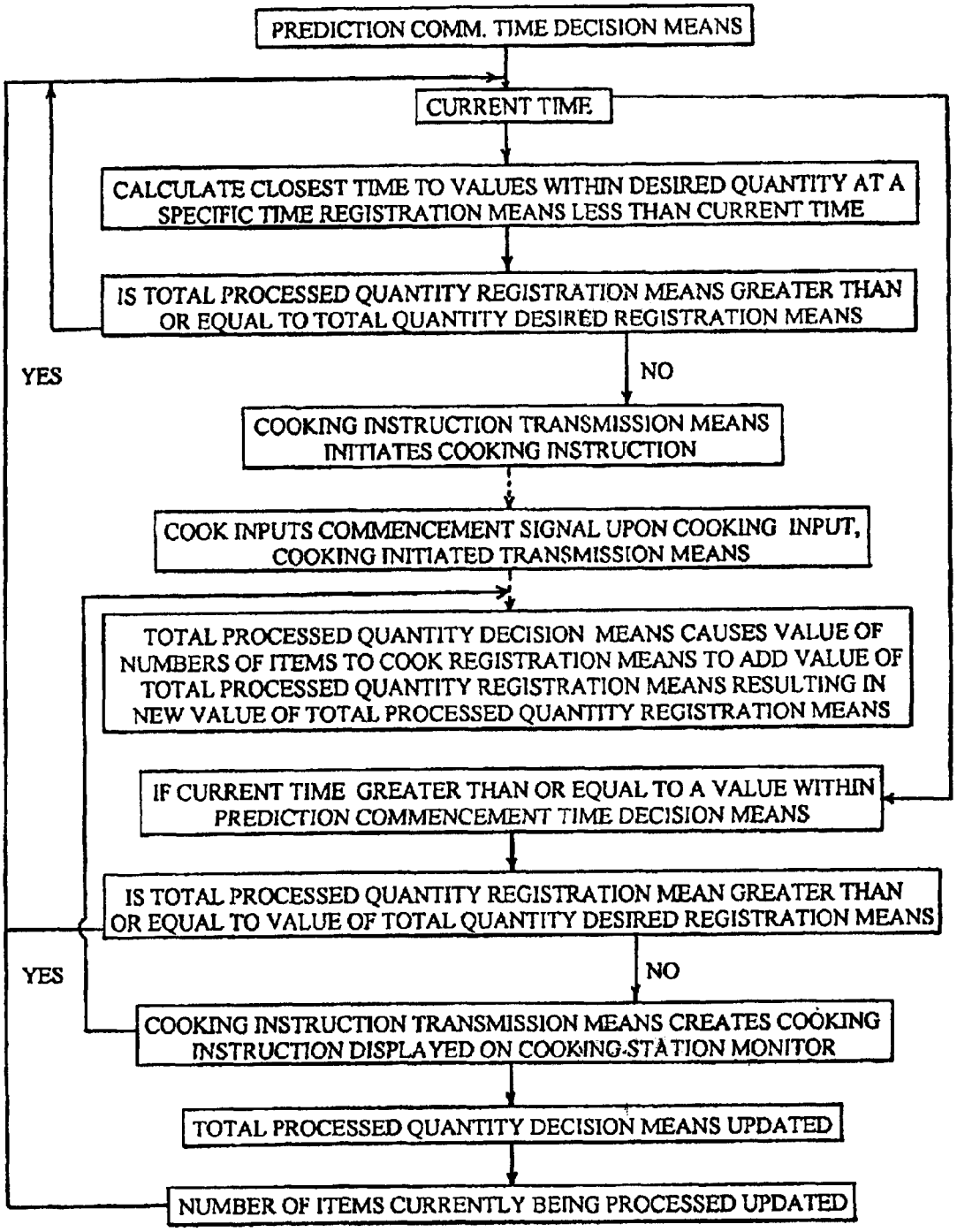
FIG. 3 is a flow chart for explaining the specific operation of the prediction commencement time decision means of FIG. 2.

Shown in FIG. 3 is a flow chart for explaining a portion of the specific operation of the prediction commencement time decision means 44. The current time is continuously maintained by the ECR. The current time is correlated to the closest time less than the current time within the desired quantity at a specific time registration means 32. The total processed quantity value determined by the total processed quantity decision means 49 and stored within the total processed quantity registration means 50 is compared to the total quantity desired value stored within the total quantity desired registration means 36 which relates to the associated time within the desired quantity at specific time registration means. Should the total processed quantity value be equal to or greater than the total quantity desired value the system will not initiate any further instructions through this portion of the logic sequence but will repetitively continue to monitor the system in this manner. However, should the total processed quantity value drop below the total quantity desired value the cooking instruction transmission means 47 signals the cooking station monitor 12 to initiate a cooking instruction for the selected food items. Upon receipt of the cooking instruction, the cook inputs a commencement signal upon the cooking input 13 which is transmitted by the cooking initiated transmission means 48. The receipt of the cooking initiated transmission signal causes the total processed quantity decision means 49 to add the value within the number of items to cook registration means 38 with the value of the total processed quantity registration means 50. As such, the value of the number of items currently being processed decision and registration means 39 is updated.

The system also predicts future needs of the food items based upon the value within the total processed quantity registration means 50. This is accomplished by initiating the prediction commencement time decision means 44 which subtracts the value within the time to prepare registration means 43 from the time value within the desired quantity at a specific time registration means 32, the resulting value thereof being entered into the prediction commencement time registration means 46. If the current time is equal to or greater that this value the system then compares the value of the total processed quantity registration means 50 to the value of total quantity desired registration means 36 for the corresponding specific time registration means 32 which corresponds to the prediction commencement registration means 46. Should the value of the total processed quantity registration means 50 be equal to or greater than the total quantity desired registration means 36 the system will continue this protocol until the set conditions change. However, should the value of the total processed quantity registration means 36 be less than the value of the total quantity desired registration means 50 the cooking instruction transmission means 47 causes a cooking instruction to be displayed upon the cooking station monitor 12. Upon receipt of the cooking instruction and the actual commencement of the cooking process by the cook, the cook inputs a commencement signal upon the cooking input 13 which is entered by the cooking initialed transmission means 48. The receipt of the cooking signal causes the total processed quantity decision means 49 to add the value within the number of items to cook registration means 38 to the current value of the total processed quantity registration means 50. The value within the number of items currently being processed registration means 39 is updated by the value within the number of items to cook registration means 38 for that particular desired time interval.

In use, an example of the prediction commencement decision means 44 is as follows. At a current time of 11:20 a.m. the current time corresponds to a prediction commencement time registration means value of 11:20 a.m. for a hamburger. The system corresponds this time to the desired quantity at specific time means value of 11:30 a.m. This corresponds to a total quantity desired registration means value of eight hamburgers (value in total quantity desired registration means 36). The system compares this value to the present value within the total processed quantity registration means 50. If the total processed quantity registration value is below eight the system will initiate a cooking instruction through the cooking instruction transmission means 47. If this value is not below eight, the system will continue with a survey of other food items and times. It should be understood that as a precaution, the system does not update the number of items presently being cooked until an input has been received from the cooking station that the cooking process has actually been commenced through the cooking initiated transmitting nd registration means 48.

As each food item is completely processed the cook initiates a finished input upon the cook's input 13 which is entered into the cooking complete decision and registration means 51. The system adds the value of the number of items to cook registration means 38 to the value of the quantity on hand decision and registration means 37 and subtracts the same value from the value within the number of items currently being processed decision and registration means 39.

The entry of a discarded or wasted food item is added to the present value within the wasted food items registration means 42 by the wasted food items decision means 41, with the resultant value being stored within the wasted food items registration means 42. Wasted food will be reflected by a subtraction of such from the quantity on hand.

Thus, it should be understood that the system instructs the cook to initiate a cooking process based upon the number of items on hand and currently being cooked in view of the number of items typically desired to have on hand at a particular time of the day. As such, the present system predicts future needs rather than statically waiting to instruct a cooking operation upon the receipt of an actual order. It is believed that the system reduces the responsibilities of the manager by predicting future needs based on particular present circumstances.

It should also be understood that the just described system may also be used in conjunction with an inventory and ordering system. Hence, the system could be adapted to check inventory prior to initiating a cooking instruction and re-order inventory should the system detect a stock level below a preselected level.

While it is believed that the Panasonic 7700 system provides the appropriate computer parameters, it should be understood that as an alternative a computer system using a Intel 486 processor or higher, 8 megabytes of RAM and a 1.2 gigabyte hard drive is sufficient to accomplish the desired tasks.

While this invention has been described in detail with particular reference to the preferred embodiments thereof, it should be understood that many modifications, additions and deletions, in addition to those expressly recited, may be made thereto without departure from the spirit and scope of invention as set forth in the following claims.

I claim:

1. A computer system for determining and transmitting cooking commencement instruction for selected food items at time intervals to supply future needs of the selected food items, comprising:

programmable memory;

a cooking station monitor;

a table of selected food items stored on said programmable memory;

a table of desired quantities of the selected food items at desired time intervals relating to said table of selected food items, said table of desired quantities at desired time intervals being stored on said programmable memory;

a table of cooking time to prepare intervals relating to said table of selected food items, said table of cooking time to prepare intervals being stored on said programmable memory;

a variable quantity of processed selected food items stored on said programmable memory;

clock means for establishing a current time;

control means for initiating a cooking instruction to said cooking station monitor in response to a selected relation between the current time and said table of desired quantities of the selected food items at desired time intervals and said table of cooking time to prepare intervals, and a selected relation between the variable quantity of selected food items and said table of desired quantities of selected food items at desired time intervals,

*wherein the variable quantity of processed selected food items is updated by a wasted food registration means for any waste food items.*

2. The computer system of claim 1 wherein said control means initiates the cooking instruction to said cooking station monitor upon the current time being equal to or less than the desired time interval with said table of desired quantities of the selected food items at desired time interval minus a preparation time interval associated with each selected food item.

3. The computer system of claim 1 wherein said control means further establishes the cooking instruction upon the quantities of processed selected food items being less than the desired quantities within said table of desired quantities of the selected food items at desired time intervals.

4. The computer system of claim 1 further comprising a variable quantity of food items presently cooking, and said variable quantities of processed food items includes said variable quantity of food items presently cooking.

5. The computer system of claim 1 further comprising a cash register and wherein said control means subtracts a number of said selected food items manually entered upon said cash register from said variable quantity of selected food items stored on said programmable memory.

6. The computer system of claim 1 further comprising a table of number of food items to be cooked at a time stored on said programmable memory and relating to said table of selected food items.

7. A computer system for determining and transmitting cooking times for selected food items at time intervals to predict future needs of the selected food items, comprising:

programmable memory;

a table of selected food items stored on said programmable memory;

a table of desired quantities of the selected food items at desired time intervals relating to said table of selected food items, said table of desired quantities at desired time intervals being stored on said programmable memory;

a variable quantity of processed selected food items stored on said programmable memory;

clock means for establishing a current time;

control means for initiating a cooking instruction in response to a selected relationship between the current time and said table of desired quantities of the selected food items at desired time intervals, and a selected relationship between the variable quantity of processed selected food items and said table of desired quantity of processed selected food items at desired time intervals,

*wherein the variable quantity of processed selected food items is updated by a wasted food registration means for any waste food items.*

8. The computer system of claim 7 further comprising a table of cooking time to prepare intervals relating to said table of selected food items, said table of cooking time to prepare intervals being stored on said programmable memory, whereby said control means for initiating a cooking instruction to said cooking station monitor does so in response to a selected relation between the current time and said table of desired quantities of the selected food items at desired time intervals and said table of cooking time to prepare intervals.

9. The computer system of claim 7 wherein said control means initiates the cooking instruction to said cooking station monitor upon the current time being equal to or less than the desired time interval with said table of desired quantities of the selected food items at desired time interval minus a preparation time interval associated with each selected food item.

10. The computer system of claim 7 wherein said control means further establishes the cooking instruction upon the variable quantity of processed selected food items being less than the desired quantities within said table of desired quantities of the selected food items at desired time intervals.

11. The computer system of claim 7 further comprising a variable quantity of food items presently cooking, and said variable quantity of processed food items includes said variable quantity of food items presently cooking.

12. The computer system of claim 7 further comprising a cash register and wherein said control means subtracts a number of said selected food items manually entered upon said cash register from said variable quantity of processed selected food items stored on said programmable memory.

13. The computer system of claim 7 further comprising a table of number of food items to be cooked at a time stored on said programmable memory and relating to said table of selected food items.

*14. A food preparation scheduling system for predicting future food needs comprising:*

*a processor;*

*a programmable memory coupled to the processor for storing tables of information about food items, the tables of information including desired quantities of selected food items at desired time intervals, cooking times for selected food items, and variable quantities of selected food items;*

*a table of selected food items stored on said programmable memory;*

*a table of desired quantities of the selected food items at desired time intervals relating to the table of selected food items, the table of desired quantities at desired time intervals being stored on said programmable memory;*

*a table of cooking time to prepare intervals relating to the table of selected food items, the table of cooking time to prepare intervals being stored on said programmable memory;*

*a first user interface operationally coupled to the processor and the programmable memory, the first user interface including a controller adapted to initiate cooking instructions to a cooking station monitor in response to a selected relation between a current time and the table of desired quantities of the selected food items at desired time intervals and the table of cooking time to prepare intervals, and a selected relation between the variable quantities of selected food items and the table of desired quantities of selected food items at desired time intervals;*

*a second user interface operationally coupled to the processor and the programmable memory and adapted to receive a cooking commencement command; and*

*a clock for establishing the current time,*

*wherein the variable quantity of processed selected food items is updated by a wasted food registration means for any waste food items.*

*15. The food preparation scheduling system of claim 14, further comprising an order receiving interface operationally coupled to the processor and the programmable memory and adapted to receive orders for food items and update the information about food items including the variable quantities of processed food items.*

*16. The food preparation scheduling system of claim 15, wherein the processor upon receiving an order for a selected number of a selected food item from the order receiving interface subtracts the selected number of the selected food item from the variable quantities of processed food items for the selected food item.*

*17. The food preparation scheduling system of claim 14, wherein the first user interface comprises an input device and an output device.*

*18. The food preparation scheduling system of claim 17, wherein the output device is a display.*

*19. The food preparation scheduling system of claim 14, wherein the processor initiates a cooking instruction for a selected food item to the first user interface upon the current time of day being equal to or less than a time value in the desired quantities of food items at desired time intervals for the selected food item minus the cooking time for the selected food item.*

*20. The food preparation scheduling system of claim 14, wherein the processor initiates a cooking instruction for a selected food item to the first user interface upon the variable quantities of processed food items for the selected food item being less than a desired quantity of the selected food item in the desired quantities of food items at desired time intervals.*

*21. The food preparation scheduling system of claim 14, wherein the variable quantities of processed food items include a sum comprising quantities of processed food items on-hand and quantities of food items presently cooking.*

*22. The food preparation scheduling system of claim 14, the information about food items further including a number of food items to be cooked.*

* * * * *